United States Patent [19]

Taber

[11] 4,099,294

[45] Jul. 11, 1978

[54] METHOD OF SKINNING SMALL ANIMALS

[76] Inventor: Gilbert L. Taber, R.D. 2, Lock Pit Rd., Clyde, N.Y. 14433

[21] Appl. No.: 817,268

[22] Filed: Jul. 20, 1977

[51] Int. Cl.² .............................................. A22B 5/16
[52] U.S. Cl. ............................................. 17/50; 17/21
[58] Field of Search ...................................... 17/50, 21

[56] References Cited

U.S. PATENT DOCUMENTS

| 2,770,006 | 11/1956 | Wilkens | 17/21 |
| 3,443,275 | 5/1969 | Radtke | 17/21 |
| 3,483,590 | 12/1969 | Balasch et al. | 17/50 X |

Primary Examiner—Frank T. Yost
Attorney, Agent, or Firm—Charles S. Mc Guire

[57] ABSTRACT

A method of removing hides or pelts from small animals. The skinning is begun in the usual manner by making incisions along the inside of each hind leg and peeling a short section of hide away from the hindquarters. The skinning is performed with the aid of a pair of rigid plate members, one of which is anchored in a fixed position, and both of which have openings through which the animal's body may pass. The short section of hide is wrapped around the movable plate and firmly engaged between the movable and fixed plates with the hind legs extending through the aligned openings. The carcass is pulled through the openings as the hide is stripped away due to its engagement between the stationary plates.

8 Claims, 3 Drawing Figures

METHOD OF SKINNING SMALL ANIMALS

BACKGROUND OF THE INVENTION

The present invention relates to methods of skinning animals, particularly small, fur-bearing animals.

Animals such as raccoon, mink, etc., which are hunted or grown primarily for the fur pelts which they provide are generally skinned by an entirely manual process. Cuts are made in the hide along the inside of each hind leg, allowing the hide to be stripped back, with the aid of a knife, over the animal's hindquarters. Skinning is continued and completed by continuing to pull the hide away from carcass in one continuous piece so that it is turned inside out, i.e., the pelt is in the nature of a bag or pouch open only at one end with the fur on the inside when skinning is completed.

It is the usual practise in most fur-producing operations to skin a number of animals consecutively. Thus, skinning may proceed for a number of hours or even several days. Since the hides of most animals adhere very tightly to the carcass, the skinning operation is very strenuous and tiresome, particularly after the same person has skinned a number of animals. Although a few hours of apparatus for aiding in skinning operations have been proposed in the past, they tend to be large and expensive, suited primarily for slaughterhouse application to large animals, and/or unsuitable for protecting the quality and integrity of fur pelts.

Accordingly, it is a principal object of the present invention to provide a method of skinning small animals which is easy and efficient, while requiring only very simple and inexpensive hardware in its application.

A further object is to provide a method of skinning small animals which may be performed by a single individual without unduly strenuous and fatiguing labor.

Another object is to provide a method of skinning small animals which may be performed rapidly and easily without substantial danger of damage to the pelts.

Other objects will in part be obvious and will in part appear hereinafter.

SUMMARY OF THE INVENTION

In accordance with the foregoing objects, the invention contemplates a method of skinning small animals which is carried out with the assistance of two rigid plate members, each having a circular opening of appropriate size though which the bodies of the animals to be skinned may pass. Skinning is commenced in the usual manner by cutting the hide along the hind legs and peeling a short section of hide over the hindquarters. The hind legs are then passed through the opening in one of plate members, which is annular in form, up to the point to which the hide has been stripped.

The stripped section of hide is then wrapped around the annular plate so that the free edge of hide is on the same side of the plate as the hind legs. The free edge of hide is then firmly engaged between the annular plate and the second plate which is firmly anchored in a fixed position. The openings in the two plates are aligned and the hind legs extend through both. As the body is pulled by the hind legs through the openings in the two plates, the hide is stripped from the carcass because of the engagement of the free edge thereof between the stationary plates. Preferably, the pulling is accomplished with the aid of a block and tackle connected to hooks in the hind legs in order to provide a mechanical advantage requiring much less force to strip the hide from the carcass.

DETAILED DESCRIPTION

Figure 1:
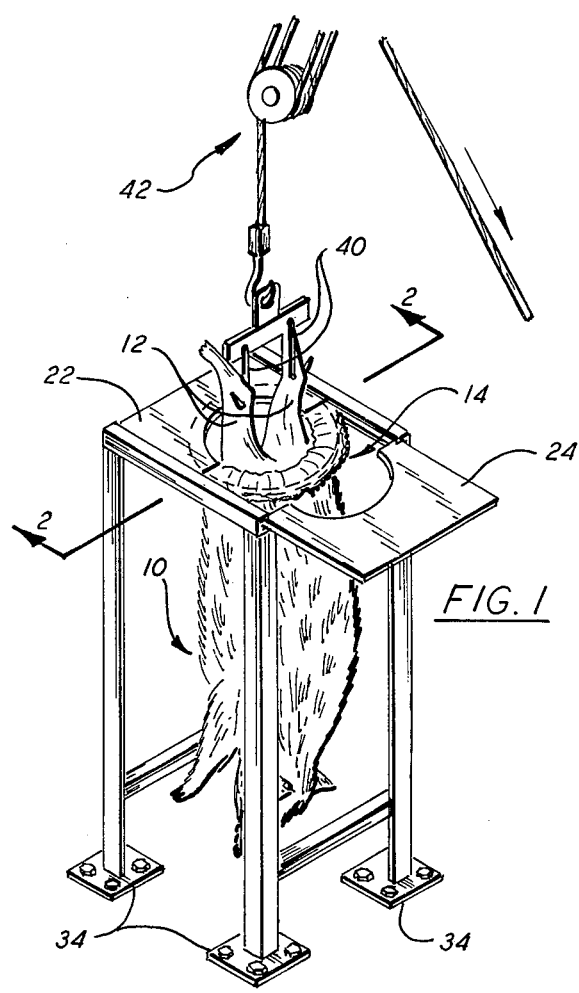
FIG. 1 is a perspective view of an animal in an initial stage of the skinning method of invention.
Figure 2:
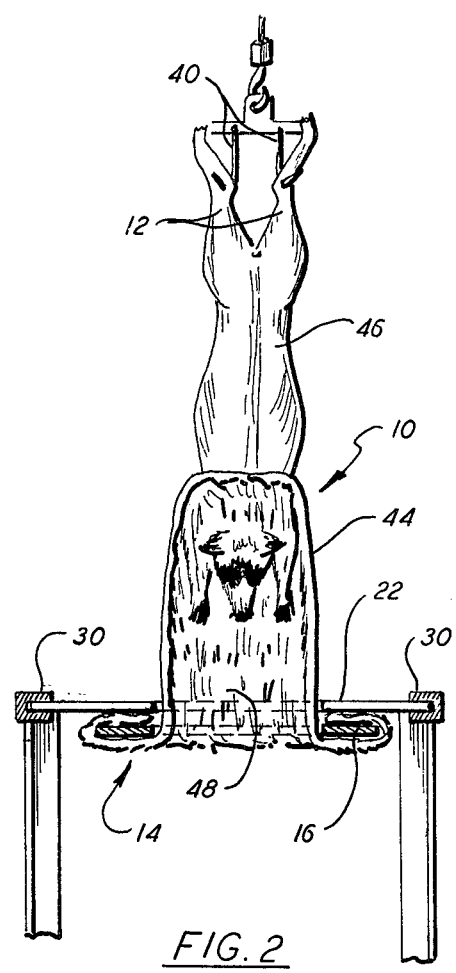
FIG. 2 is a fragmentary, elevational view in section on the line 2—2 of FIG. 1, showing the animal at a subsequent stage of the skinning operation.

Referring now to the drawing, in FIGS. 1 and 2 is shown a small animal such as a raccoon, mink, or the like, denoted generally by reference numeral 10. Prior to supporting the animal in the position shown in FIG. 1, skinning has been commenced in the conventional manner of making cuts along the inside of both hind legs 12 and separating the hide from the hind legs and for a short distance over the animal's hindquarters. The short section of hide thus separated is denoted generally by reference numeral 14. After this initial step, the apparatus which is used to assist in the skinning method is then employed.

Figure 3:
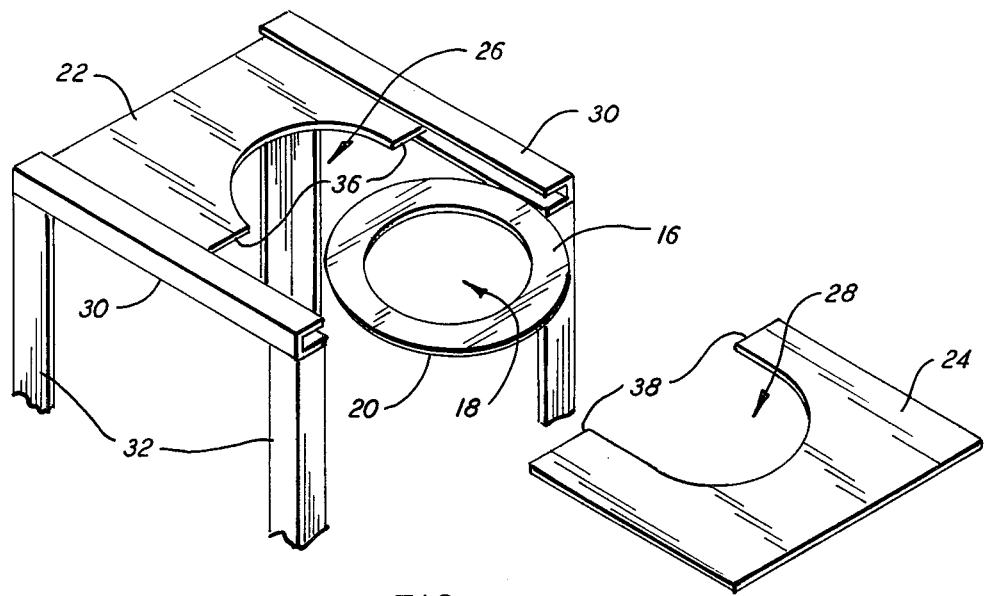
FIG. 3 is a fragmentary, elevational view of an exemplary form of the hardware used in performing the method.

The apparatus includes a pair of rigid plate members, a preferred form of which is shown in FIG. 3. Plate 16 is annular in form, having a circular central opening 18 and concentric outer periphery 20. The other plate is preferably provided in two separate sections 22 and 24 each having an open semi-circular area 26 and 28, respectively, extending into one edge thereof. Inwardly facing channel members 30 are welded or otherwise rigidly affixed to the upper ends of legs 32 which are anchored at their lower ends, e.g., by being bolted to the floor as indicated in FIG. 1 at 34.

Section 22 of the second plate is rigidly attached to channel members 30 and section 24 may be slidably inserted therein for abutment of edges 36 and 38 of sections 22 and 24, respectively, whereby a circular opening is formed by semi-circular areas 26 and 28. The opening thus formed by sections 22 and 24 of the second plate is of the same size as opening 18 in the first plate 16. When section 24 is supported along its two side edges by channel members 30 and edges 36 and 38 are in abutting relation, sections 22 and 24 form, in effect, a single rigid plate member supported in a fixed position which, in the illustrated embodiment, is a substantially horizontal plane.

In order to skin animal 10 according to the method of the invention, after removing short section of hide 14 as previously described, hind legs 12 are passed through opening 18 in plate 16. When the inside (skin) of hide section 14 is in contact with one side plate 16, section 14 is wrapped around outer periphery 20 of the plate and folded over to contact the opposite side. Thus, the skin side of hide section 14 contacts both sides of plate 16 and the fur side of hide section 14 is facing outward, about the plate.

At this time (or prior to wrapping hide section 14 about plate 16, if desired) hooks 40 are engaged with hind legs 12, supporting animal 10 in the position shown in FIG. 1. A conventional block and tackle mechanism, a portion of which is indicated in FIG. 1 at 42, supports hooks 40 and animal 10. With hind legs 12 positioned in the space defining the opening formed by plate sections 22 and 24 when assembled, section 24 is inserted in channel members 30 and edges 36 and 38 are brought into abutting relation. Animal 10 is then raised by any amount necessary to cause the portion of hide section 14 on the upper side of plate 16 to be firmly engaged between plate 16 and the lower side of plate sections 22 and 24 in the area surrounding the opening formed thereby.

It is apparent that once hide section 14 is engaged between the two plates, an upward force exerted on hind legs 12 will serve to engage the hide section even more firmly. Thus, as animal 10 is drawn upward through the aligned openings in the juxtaposed plates the hide will be stripped away from the carcass. In FIG. 2, hide 44 is mostly stripped from carcass 46 as animal 10 has been drawn completely through the openings in the two plates. Continued upward movement from the position of FIG. 2 will result in complete separation of hide and carcass with the hide essentially in the form of a pouch open at the end adjacent hide section 14 and fur side 48 on the inside. Plate 16, of course, is easily removed once hide 44 is completely separated. Although most animal hides adhere tightly and may by manually removed only with a great deal of effort, the mechanical advantage provided by block and tackle 42 reduces greatly the force required to move the animal as the hide is held stationary at one end.

What is claimed is:

1. A method of skinning small animals with the aid of first and second rigid plate members each having an opening through which the body of the animal may pass, said method comprising:
   (a) manually beginning hide removal by peeling away from the carcass a short section of hide about the animal's hindquarters;
   (b) passing the animal's hind legs through the opening in a first of said plate members from a first side thereof leaving said short section of hide on said first side;
   (c) placing said short section of hide about said first plate member from said first side thereof, over the outer periphery and upon the second side;
   (d) rigidly supporting the second plate member in a fixed position;
   (e) passing the animal's hind legs through the opening in said second plate member from a first side thereof;
   (f) positioning said first plate member in juxtaposition with said second plate member with the openings in the two substantially aligned and said short section of hide firmly engaged between said first plate member second side and said second plate member first side; and
   (g) pulling the carcass in said first direction completely through the aligned openings in said plate members, with said hide section remaining engaged therebetween.

2. The invention according to claim 1 wherein the step of pulling the carcass is continued until the hide is completely separated from the carcass.

3. The invention according to claim 1 wherein said first plate member is substantially horizontal in said fixed position thereof.

4. The invention according to claim 3 wherein said pulling is in a vertically upward direction.

5. The invention according to claim 1 and further including attaching hook means to the animal's hind legs performing said pulling step by pulling on said hook means.

6. The invention according to claim 1 wherein said second plate member is divided into two separable pieces along a line extending through the openings therein, and including the further steps of separating said pieces and positioning said first plate member in juxtaposition with one of said pieces with the animal's hind legs extending through the portion of the opening formed thereby, and subsequently placing the other of said pieces in adjoining relationship with said one piece to complete the opening said second plate member prior to said pulling step.

7. The invention according to claim 1 wherein both of said openings are circular and of substantially the same size.

8. The invention according to claim 7 wherein said outer periphery of said first plate member is circular.

* * * * *